INVENTOR.
ARTHUR OGREN
BY Morse & Altman
ATTORNEYS

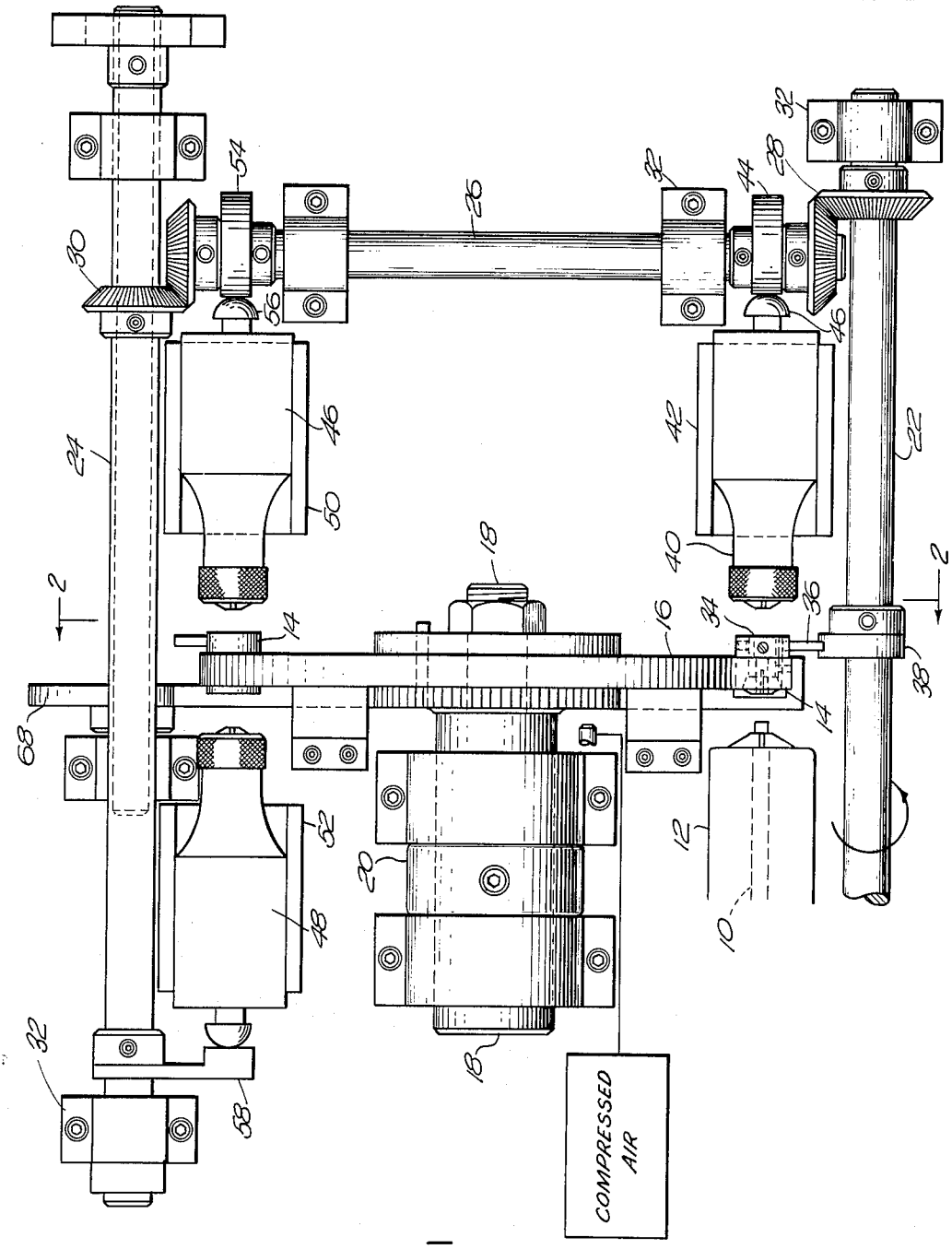

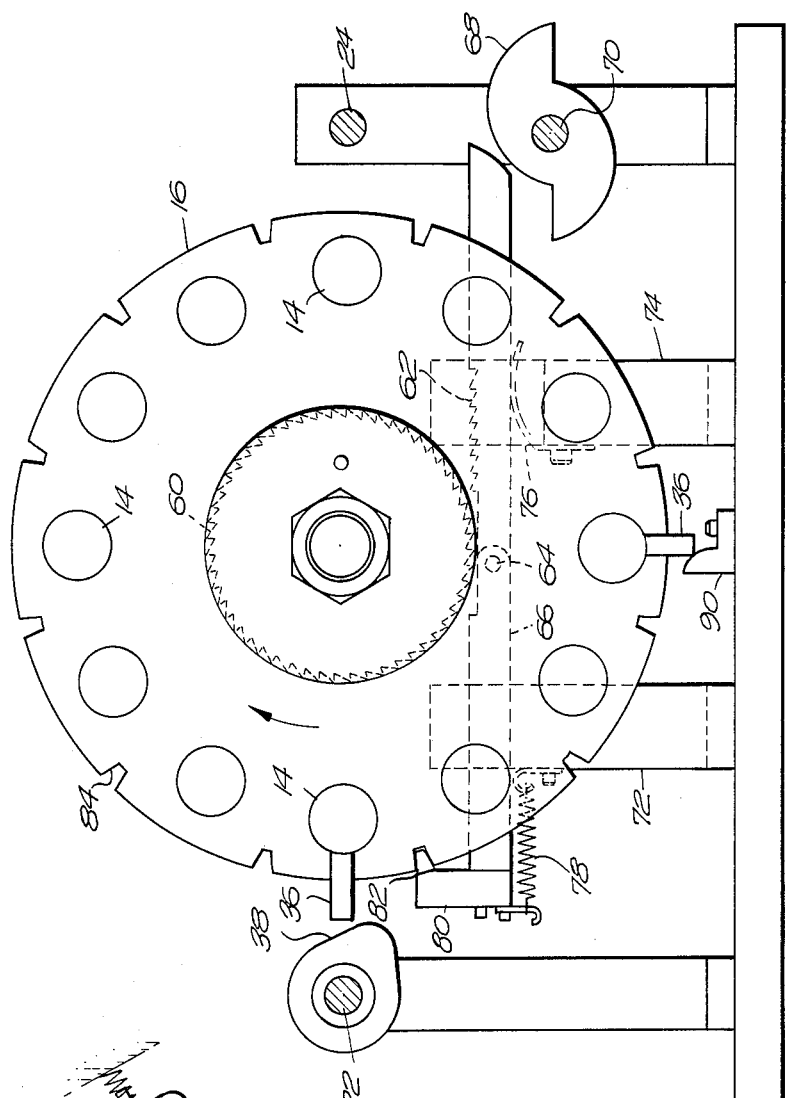

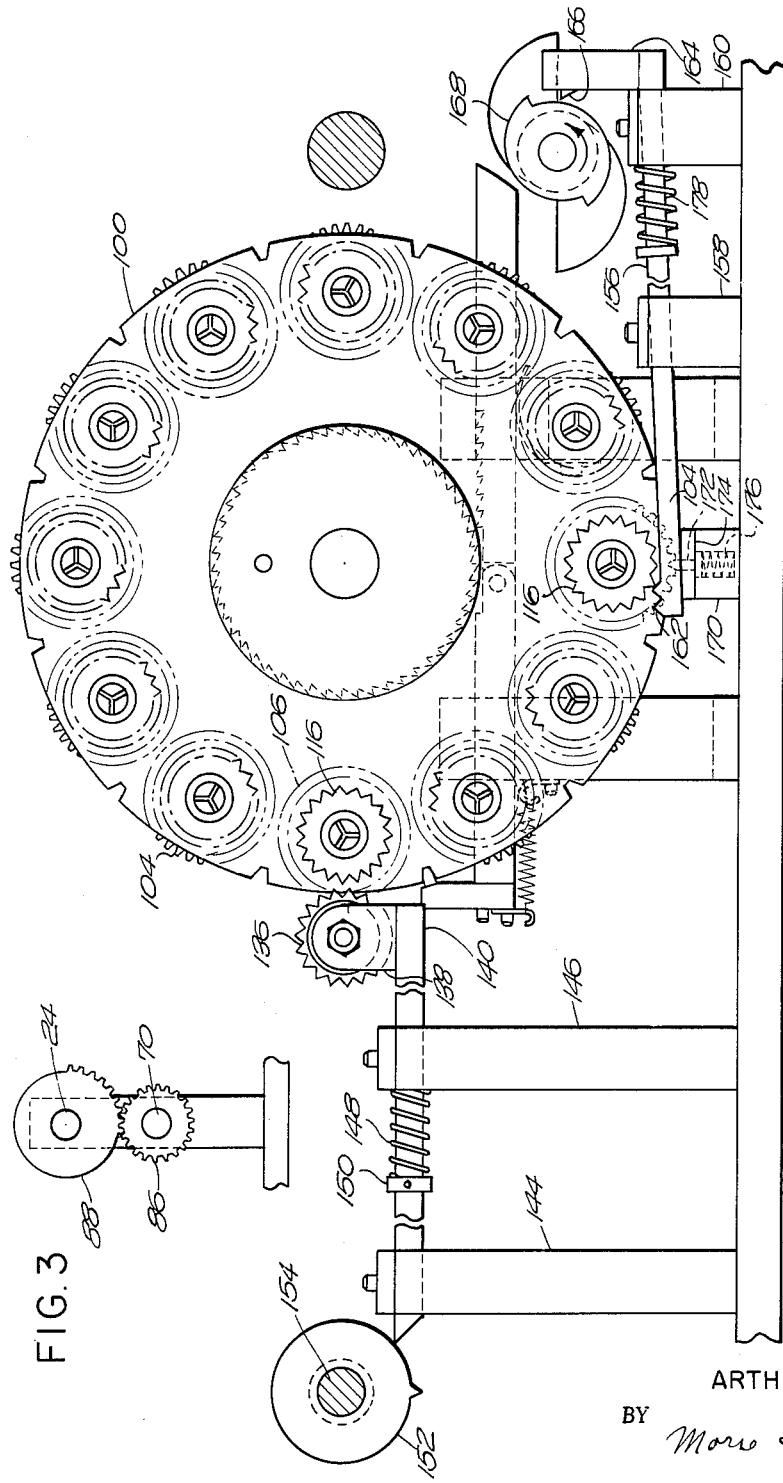

3,252,201
LATHE TRANSFER MECHANISM
Arthur Ogren, Greenfield, Mass.
Filed Nov. 4, 1963, Ser. No. 321,069
8 Claims. (Cl. 29—38)

The present invention relates generally to automatic lathes, screw machines and the like and more particularly is directed towards a new and improved lathe transfer mechanism for use in transferring screw machine products from one station to another for various cutting, forming and finishing operations.

In my co-pending application, Serial No. 257,667, filed February 11, 1963, there is disclosed an automatic lathe having a feed mechanism adapted to advance a length of stock to a cutting station. In my co-pending application a section of the stock is held in the cutting station long enough to undergo one or two cutting operations and then the piece is ejected. While the mechanism is able to operate at a high rate of speed and perform accurate cutting operations on the part, the number and variety of forming operations that can take place is limited since there is only one cutting station.

Accordingly, it is an object of this invention to provide improvements in automatic lathes.

Another object of this invention is to provide a lathe transfer mechanism for use in automatic lathes and screw machines whereby a workpiece may be quickly and automatically transferred from one cutting or finishing station to another.

Still another object of this invention is to provide an improved mechanism for temporarily holding a workpiece during forming operations.

Yet another object of this invention is to provide a new and improved indexing mechanism for transferring lathe products through various finishing stations.

More particularly this invention features a lathe transfer mechanism employing a transfer wheel having a plurality of circularly arrayed chucks for engaging parts that are to be finished. The wheel is arranged to index each part through different cutting or finishing stations to a release station where the finished part is ejected. The invention also features a novel mechanism for opening and closing the jaws of the chucks disposed about the transfer wheel. The chuck actuating mechanism is coordinated with an intermittent drive mechanism adapted to index the transfer wheel through different angular positions to carry the chucks from one cutting, forming or finishing station to another. When the various cutting and forming operations have been completed, means are provided for opening the jaws of each chuck and ejecting the finished part.

But these and other features of the invention, along with further objects and advantages thereof, will become more fully apparent from the following detailed description of the preferred embodiments of the invention, with reference being made to the accompanying drawings, in which:

FIG. 1 is a top plan view of a lathe transfer mechanism made according to the invention;

FIG. 2 is a sectional view taken along the line 2—2 of FIG. 1,

FIG. 3 is an end elevation showing details of the FIG. 2 mechanism,

FIG. 4 is a view similar to FIG. 2 showing a modification of the apparatus,

Figure 5:
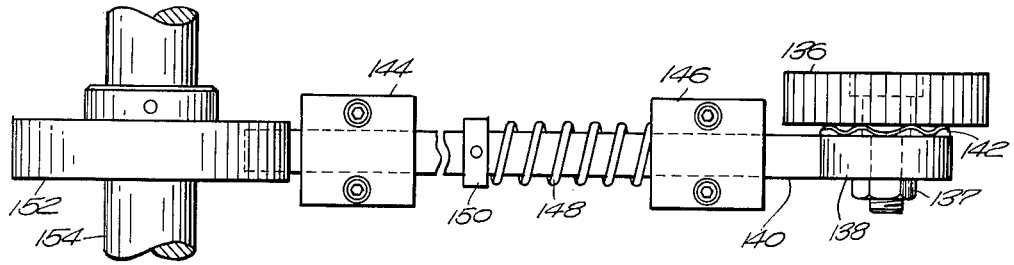
FIG. 5 is a detailed plan view of the collet locking mechanism of FIG. 4.

Referring now to FIGS. 1, 2 and 3 of the drawings, the reference character 10 generally indicates a length of feedstock which is intermittently advanced through a chuck 12. The stock is fed from the jaws of the chuck 12 into one of a plurality of collets 14 disposed about the margin of a transfer wheel 16. The wheel 16 is mounted for rotation about the shaft 18 which in turn is supported by bearing blocks 20. The wheel 16 is disposed between a pair of drive shafts 22 and 24 geared together by a cross-shaft 26 and sets of bevelled gears 28 and 30. Bearing blocks 32 are provided to support the several shafts for rotation about their longitudinal axes.

Each of the collets 14 is threaded to a collar 34 which carries a radially extending post 36 adapted to engage a cam 38 keyed to the shaft 22. It will be understood that the jaws of the collet 14 will normally be open and that closing of the collet jaws is effected by the lobe of the cam 18 rotating into engagement with the post 36. In practice, the transfer wheel will be at rest when the cam 38 engages the post 36 to close the jaws of the collet onto a section of stock 10 which has been fed into the collet. Axial movement of the stock 10 is limited by means of the nose portion of a spindle 40 mounted in line with the chuck 12 and on the opposite side of the wheel 16.

In practice, the stock first will be machined while held in the chuck 12. A suitable cutting tool and automatic tool drive (not shown) of the sort shown in my copending application will be provided. After this machining step has been completed, the part is cut off from the rest of the stock and pushed axially along into the collet 14. While in the collet the spindle 40, which is mounted in a slide 42, will be reciprocated by means of a cam 44 mounted to the cross-shaft 26 and riding against a cam follower 46. The spindle 40 may be provided with a drill or other tool to perform a specified machining operation to the part held by the collet 14. After a full revolution of the cam 44, the particular forming operation is completed and the spindle 40 retracts. A spring (not shown) mounted within the slide 42 may be employed for urging the spindle 40 into a normally retracted position.

As soon as the spindle 40 has completed its machining operation, the post 36 is pivoted by the cam 38 to unlock the collet from the machined part.

Simultaneously with the operation of the spindle 40, a pair of oppositely facing spindles 46 and 48, mounted on cross slides 50 and 52 respectively, are moved towards another part held by a collet 14 which previously has been carried 180° by the wheel 16 from the first machining station. It will be understood that each of the spindles 46 and 48 carries a suitable tool such as a drill, reamer, burr or the like to perform the desired finishing operation. Each of the spindles typically is rotated by a self-contained electric motor running at a constant speed and enclosed within the spindle housing. The spindle 46, as shown, is reciprocated by means of a cam 54 mounted on the cross shaft 26 and bearing against a follower 56 while the spindle 48 is actuated by cam 58 mounted on the drive shaft 24. Suitable return means such as springs or the like are provided to maintain the spindles in normally retracted positions.

Referring now more particularly to FIG. 2 of the drawings, there is illustrated an indexing mechanism for automatically advancing the transfer wheel 16 into different angular positions whereby a collet 14 will carry a part from one machine station to the next. As best shown in FIG. 2, the indexing mechanism includes a ratchet wheel 60 mounted concentrically to the face of the transfer wheel 16 and adapted to mesh with a rack 62 disposed tangentially to the underside of the rachet wheel. The rack 62 has one end pivotally mounted by pin 64 to the end of the push rod 66. The opposite end of the rack 62 is adapted to engage a lobe of a double cam 68 mounted on a shaft 70. The shaft 70 will be seen to extend in spaced parallel relation below the drive shaft 24. The rack 62 and the push rod 66 are slideably supported by a pair of upright standards 72 and 74. The standard 74 is provided with a curved flat spring 76 which bears against the underside of the rack 62 and permits the rack to ride over the teeth of the rachet wheel 60 on a return stroke of the push rod and rack. A coil spring 78 is connected between the standard 72 and the outer end of the push rod 66 normally urging the push rod and rack to the right as viewed in FIG. 2.

Mounted on the outer end of the rod 66 is an arm 80 carrying a dog or detent stop 82 which is adapted to engage indent stops or notches 84 formed in evenly spaced relation about the peripheral edge of the transfer wheel 16. Typically the notches 84 are spaced at 30° intervals with each indent appearing mid-way between a pair of collets 14 which are also arranged at 30° intervals.

The shaft 70 is driven by means of a gear 86 (see FIG. 3) which meshes intermittently with a gear 88 mounted fast to the drive shaft 24. The gear 88 is provided with a single 90° sector of gearing having only ten teeth. The gear 86 is a full gear with a complement of twenty teeth. Thus, for every revolution of the shaft 24 and gear 88, the shaft 70 and gear 86 will make ½ a revolution and it will be understood that the double cam 68 will also make ½ of a revolution. Each time the double lobe cam 68 completes a half revolution, the rack 62 and the push rod 66 are reciprocated to bring the teeth of the rack into mesh with the teeth of the rachet gear 70 and thereby index the wheel 16 30° clockwise. The rack and push rod are adapted to move a short distance at the beginning of each stroke before the rack teeth mesh with the ratchet wheel in order to permit the dog 82 to be withdrawn from a notch 84 before the wheel 16 is rotated. At the end of each stroke, after the wheel has been indexed 30°, the dog will then reseat in the next notch thereby stopping the wheel 16 at the precise angular position for a subsequent drilling, finishing or other forming operation by the spindles.

It will be noted also in FIG. 2 that a trip 90 is mounted on the base of the machine and is arranged to engage the posts 36 of the collets 14 as they are moved past. It will be understood that as each collet indexes from the final finishing station, its post will strike the trip 90 to rotate its respective collar 34 and thereby open the collet. With the jaws of the collet in the open position, the finished part may be ejected by means of a jet of air or by other suitable means.

Figure 6:
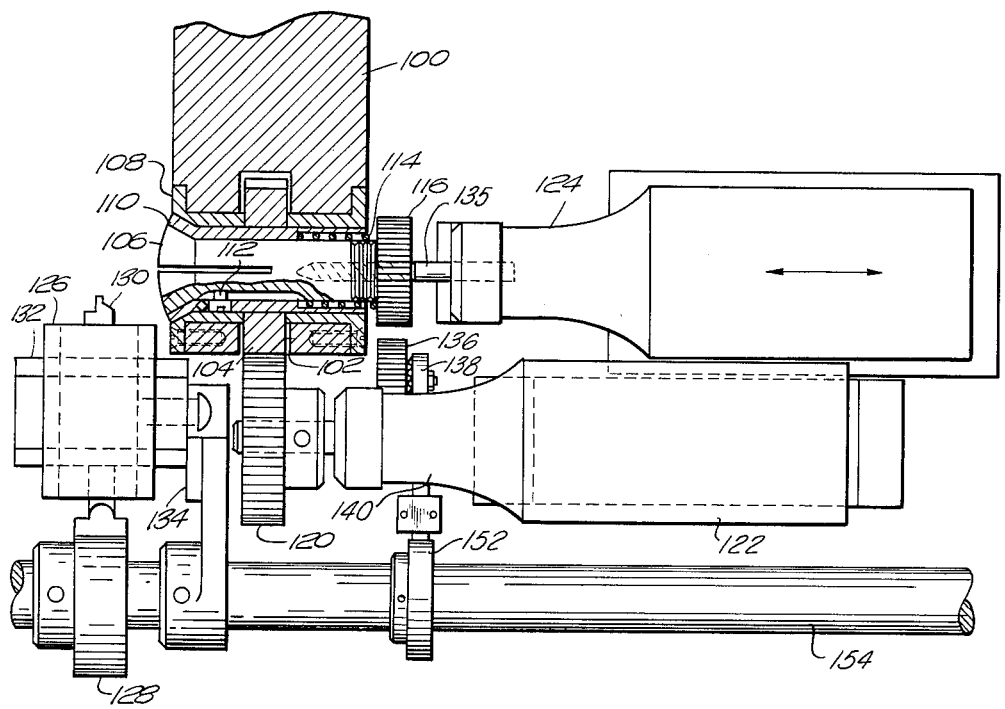
FIG. 6 is a fragmentary top plan view partly in section showing the collet rotating mechanism, and, FIG. 7 is a detail view of a modified collet.

Referring now to FIGS. 4, 5 and 6 of the drawings, there is illustrated a modification of the invention, and in this embodiment a transfer wheel 100 is formed with a peripheral groove 102 to accommodate a gear 104 associated with each of a plurality of collets 106 evenly spaced about the margin of the wheel 100. As best shown in FIG. 6, each collet is disposed in a hole bored through the wheel 100 and includes a sleeve 108 consisting of two half sections. The gear 104 is located between the half sections of the sleeve 108 and is keyed to a bearing 110. The collet 106 fits within the bearing and turns with the bearing by means of a setscrew 112 which has a shank sliding in the collet groove. A coil spring 114 is compressed between a collar 116 formed with geared teeth about its outer periphery and a shoulder 118 formed in the bearing 110. This arrangement keeps the collet 106 in a normally retracted or closed position.

A gear 120, mounted on a motor-driven spindle 122, meshes with the gear 104 to rotate the collet 106. In practice the collet is stationary until the transfer wheel 100 turns and just before it reaches a locking position, the gears 104 and 120 engage. It will be understood that the motor for the spindle 122 is synchronized with the speed of the main spindle or chuck 12 (FIG. 1) rotating the feed stock 10. Upon completion of the cutting, drilling or other operations which may be performed by a spindle 124, the transfer wheel 100 indexes and the gear 104 moves out of mesh with the gear 120. The collet then comes to rest to permit drilling or further cutting operations to be made on the part held in the collet. Various types of cutting tools or other similar type mechanisms may be located wherever there is a spindle to permit a large variety of operations to be formed on the part. By providing the live collet, the part may be cut at one station by rotating it and in another station the part may be held stationary to permit drilling, milling or the like.

Shown in FIG. 6 is a cross-slide 126 which is actuated by a double cam 128. The cross-slide carries a cutting tool 130 which is moved inward until it reaches a predetermined depth at which time a cross-slide 132 moves the tool bit 130 laterally by means of a cam 134. Upon completion of this operation the two slides retract and the double cam 128 causes the part to be cut off. At this point, the spindle 124 is advanced to push against the rear end of the collect 106 thereby opening its jaws and acting as a stop for accurate positioning of the part. After the part has been fed into the collet, the spindle 124 may also be employed for drilling or other purposes. When the spindle is used to perform drilling, a drill 135 may be mounted in the left-hand end of the spindle 124 as viewed in FIG. 6.

Referring now more particularly to FIGS. 4 and 5 of the drawings, there is illustrated a novel mechanism for locking and unlocking the collets 106 rotatably mounted in the transfer wheel 100. The locking mechanism includes a gear 136 which is adapted to be moved into and out of mesh with the gear 116 provided on each of the collets 106. The gear 136 is mounted to an arm 138 formed on the end of a push rod 140. A corrugated friction washer 142 is sandwiched between the gear 136 and the arm 138 to apply drag on the gear 136. This drag may be varied by tightening the gear against the washer by means of a nut 137 for reasons that will presently appear. The push rod 140 is slidably mounted to a pair of upright standards 144 and 146 and is urged in a normally retracted position by means of a coil spring 148 pressed between the standard 146 and a collar 150 attached to the push rod. The outer end of the push rod 140 is adapted to engage with a cam 132 keyed to a drive shaft 154 which also carries the cams 128 and 134. It will be understood that, as the cam 132 is rotated, the push rod and its gear 136 will be caused to reciprocate back and forth moving the gear 136 into and out of mesh with the gear 116.

In operation, when the collet 106 is in a closed position and the collet gear 104 is in mesh with the spindle gear 120, the cam 152 actuates the push rod 140 thus bringing the drag gear 136 into mesh with the gear 116. Since the gear 116 is rotating rapidly, the collet 106 will be tightened by the gear 116 turning on the threaded end of the collet and against the right-hand end of the sleeve 108, as viewed in FIG. 6, thereby drawing the collet to the right and into locking position; the extent of the tightening action being related to the amount of pressure between the friction washer 142 and the gear 136. After the collet is tightened, the cam 152 moves out of contact with the push rod which then retracts.

The unlocking mechanism for the collets is shown in FIG. 4 and includes a push rod 156 slideably mounted in standard 158 and 160. A pair of V-shaped teeth 162 are formed on the end of the push rod 156 which teeth are adapted to mesh with the teeth of the gears 116. The opposite end of the push rod 156 has an upstanding post 164 to which is mounted a follower 166 which cooperates with a cam 168 in reciprocating the push rod 156.

A block 170, located directly under the gears 104, carries a gear tooth 172 equipped with a flange 174 and urged normally upwards by means of a spring 176. As the transfer wheel 100 is indexed 30°, the gear 104 rolls over the gear tooth 172 and locks the gear 104 when the transfer wheel comes to a stop. The spring 176 is a precautionary device in the event that the top of a tooth in a gear 104 should contact the tooth 172 before it snaps into place. With the gear 104 in locked position, the cam 168 shifts the push rod 156 to the right, as viewed in FIG. 4, thereby engaging teeth 162 with a gear 116. This will unlock the collet 106. The dwelling point on the cam 168 holds the push rod 156 until the transfer wheel 100 turns again. As the gear 104 and collet 106 assembly clear the locking tooth 172, a spring 178 will retract the push rod ahead of the next collet assembly to the position shown.

In FIG. 7 there is illustrated a modified collet assembly and in this embodiment a collet 180 is provided with a gear 104' for rotating the collet by means of a motor as in FIG. 6. However, in addition to the gear 104', the collet 180 is also provided with a ratchet wheel 184 adapted to engage a spring loaded pawl 186. The pawl is mounted on the transfer wheel and is adapted to permit the collet 180 to turn in one direction only. Thus various cutting and drilling operations may be carried on conveniently without the need of fully locking the collet. For example, when drilling a part in a counterclockwise direction, the collet will be locked against rotation in that direction by means of the pawl engaging the ratchet. The arrangement also permits the part held by the collet to be turned at various angles for different cuts.

It will be appreciated that the above apparatus is useful in the mass production of screw-machine parts and provides a relatively simple mechanism for transferring parts from one machine station to another. The mechanism permits a number of different operations to be formed on any particular part and also permits these operations to be carried on simultaneously so that a high rate of production is possible.

While the invention has been described with particular reference to the illustrated embodiments, it will be understood that numerous modifications thereto will appear to those skilled in the art. It will also be understood that the above description and accompanying drawings should be taken as illustrative of the invention and not in a limiting sense.

Having thus described the invention, what I claim and desire to obtain by Letters Patent of the United States is:

I claim:

1. In an automatic screw machine having a plurality of operating stations, mechanism for transferring screw-machine product parts through various cutting and finishing stations, including a rotary wheel mounted to said machine, a plurality of collets evenly distributed about the margin of said wheel, each of said collets being adapted to receive a screw-machine part fed axially into said collet at one station, a locking member associated with each of said collets, cam means operatively mounted to said machine at said one station, said cam means being adapted to actuate said collet locking means at said one station, second cam means being angularly spaced from said first cam means and being adapted to actuate said collet locking means into an unlocked position, means for indexing said wheel from one stop position to another, each of said stop positions being equally spaced from one another, spindle means mounted on said machine at various stop positions on either side of said wheel, said spindle means being adapted to carry preselected finishing tools and being adapted to move to and away from said wheel whereby selected part-forming operations may be performed on parts carried by said collets when said wheel indexes said parts through said station and means for ejecting said parts from said collets upon completion of said operation.

2. A mechanism according to claim 1 wherein said indexing means includes a gear concentrically mounted to said wheel, a rack adapted to mesh with said gear and means for intermittently reciprocating said rack.

3. In an automatic screw machine having a plurality of spaced operating stations, a mechanism for transferring screw-machine product parts from one station to another, comprising a rotary wheel, a plurality of independently rotatable collets evenly distributed about the margin of said wheel, each of said collets being adapted to receive a screw-machine part fed axially into said collet at one station, means for locking said collets against rotation at said one station, means for indexing said wheel from one stop position to another to thereby carry said locked collets from one station to another, means for selectively rotating said collets, part finishing means mounted on said mechanism at various stop positions adjacent the path of said wheel and forming other operating stations, said finishing means being adapted to carry preselected finishing tools and being adapted to move to and away from said wheel whereby selected finishing operations may be performed on parts carried by said collets when said wheel indexes said parts through said stations and means for unlocking said collets from said parts and ejecting said parts from said collets upon completion of said operations.

4. A mechanism according to claim 3 wherein said indexing means comprises a gear concentrically mounted to said wheel, a rack adapted to mesh with said gear and intermittent drive means adapted to reciprocate said rack at predetermined periods.

5. A mechanism according to claim 4 wherein said wheel is formed with a plurality of evenly spaced peripheral notches and a dog is mounted on said rack to engage one of said notches when said wheel is in a stop position.

6. In an automatic screw machine having a plurality of spaced operating stations, a mechanism for transferring screw-machine product parts from one station to another, comprising a rotary wheel, a plurality of axially rotatable collets evenly distributed about the margin of said wheel and parallel to the axis of said wheel, each of said collets being adapted to receive a screw-machine part fed axially into said collet at one station, driving means engageable with said collets at said one station for rotating a collet at said station, a gear threaded to said collet for opening and closing the jaws thereof, a geared drag wheel mounted to said mechanism for intermittent engagement with said gear during periods of rotation for closing the jaws of said collet, gear means spaced from said drag wheel for rotating said gear in an opposite direction to open said jaws, means for indexing said wheel from one stop position to another to thereby carry said collets from one station to another, part forming means mounted on said mechanism at various stop positions adjacent the path of said wheel and forming other operating stations, said forming means being adapted to perform selected part-forming operations on parts carried by said collets when said wheel indexes said parts through said stations and means for ejecting said parts from said collets upon completion of said operations.

7. A mechanism according to claim 6 including adjustable friction means engaging said drag wheel to vary the drag on said wheel.

8. Mechanism according to claim 1 wherein said collets are rotatable about axes extending through the margins of said wheel and parallel to the axis of said wheel, and means at at least one of said stations for rotating said collets.

References Cited by the Examiner
UNITED STATES PATENTS

| | | | |
|---|---|---|---|
| 167,005 | 8/1875 | Meigs | 29—1.31 |
| 666,905 | 1/1901 | Packer | 29—33.8 |
| 1,980,440 | 11/1934 | Rupple | 29—38.2 |
| 2,060,159 | 11/1936 | Yager | 29—38.2 |
| 2,321,298 | 6/1943 | Johnson | 29—38.2 |
| 2,379,242 | 6/1945 | MacNeill | 29—38.2 |
| 2,423,367 | 7/1947 | Bolender | 29—39 |
| 2,606,359 | 8/1952 | Stadthaus | 29—38 |
| 2,639,491 | 5/1953 | Rose | 29—33.8 |
| 2,729,879 | 1/1956 | Sampson | 29—33.8 X |

RICHARD H. EANES, Jr., *Primary Examiner.*